(12) United States Patent
Hans

(10) Patent No.: US 7,183,688 B2
(45) Date of Patent: Feb. 27, 2007

(54) STATOR FOR AN ELECTRIC MOTOR

(75) Inventor: Helmut Hans, Sankt Georgen (DE)

(73) Assignee: Minebea Col, Ltd., Miyota-machi (JP)

( * ) Notice: Subject to any disclaimer, the term of this patent is extended or adjusted under 35 U.S.C. 154(b) by 0 days.

(21) Appl. No.: 11/067,276

(22) Filed: Feb. 28, 2005

(65) Prior Publication Data

US 2005/0206266 A1    Sep. 22, 2005

(30) Foreign Application Priority Data

Mar. 17, 2004    (DE)    ...................... 10 2004 013 098

(51) Int. Cl.
*H02K 1/12* (2006.01)
*H02K 1/16* (2006.01)

(52) U.S. Cl. ...................... 310/216; 310/179
(58) Field of Classification Search ........ 310/179–180, 310/184, 185, 186–187, 216–217
See application file for complete search history.

(56) References Cited

U.S. PATENT DOCUMENTS

| | | | |
|---|---|---|---|
| 3,631,278 A * | 12/1971 | Snively | ...................... 310/158 |
| 3,633,056 A | 1/1972 | Hoffmeyer | |
| 3,671,790 A * | 6/1972 | Widstrand | ................... 310/216 |
| 3,783,318 A * | 1/1974 | Widstrand | ................... 310/216 |
| 3,942,055 A * | 3/1976 | Hoffmeyer | ................... 310/216 |
| 4,241,274 A * | 12/1980 | Brammerlo | ................. 310/259 |
| 6,081,059 A * | 6/2000 | Hsu | ........................... 310/179 |
| 6,836,035 B1 * | 12/2004 | Pawletko | .................. 310/49 R |

FOREIGN PATENT DOCUMENTS

| | | | |
|---|---|---|---|
| DE | 1990422 | 8/1968 | |
| DE | 3704226 A1 | 8/1987 | |
| JP | 60-176450 | * 9/1985 | ................. 310/216 |
| WO | WO 2004/010559 A2 | 1/2004 | |

* cited by examiner

*Primary Examiner*—Tran Nguyen
(74) *Attorney, Agent, or Firm*—Duane Morris LLP

(57) ABSTRACT

A stator for an electric motor having a stator core which has a number of stator teeth and stator slots located between the stator teeth, the stator slots being designed to receive stator windings, the stator slots being given different depths in order to accommodate the portions of the stator windings of one phase or several phases of the electric motor respectively.

19 Claims, 4 Drawing Sheets

STATOR FOR AN ELECTRIC MOTOR

FIELD OF THE INVENTION

The invention relates to a stator for an electric motor having a stator core which has a number of stator teeth and stator slots located between the stator teeth, the stator slots being designed to receive stator windings.

BACKGROUND OF THE INVENTION

More generally, the invention relates to the field of electric motors having permanent magnets such as brushless, electronically commutated DC motors and other permanent magnet motors, the motor according to the invention being configured as either an inner rotor motor or an outer rotor motor. In general, inner rotor motors consist of a rotor arrangement which is mounted onto a motor shaft and includes one or more permanent magnets, as well as a stator arrangement having a stator core which is constructed, for example, from metal laminations and carries windings.

In the case of inner rotor motors, the rotor arrangement is coaxially inserted into the stator arrangement and rotatably journaled with respect to the stator arrangement using appropriate bearings.

For outer rotor motors, the stator is fixed to the likewise stationary shaft. The teeth of the stator aligned radially outwards are enclosed by the rotor arrangement that is rotatably journaled with respect to the stator arrangement using appropriate bearings.

Figure 3:
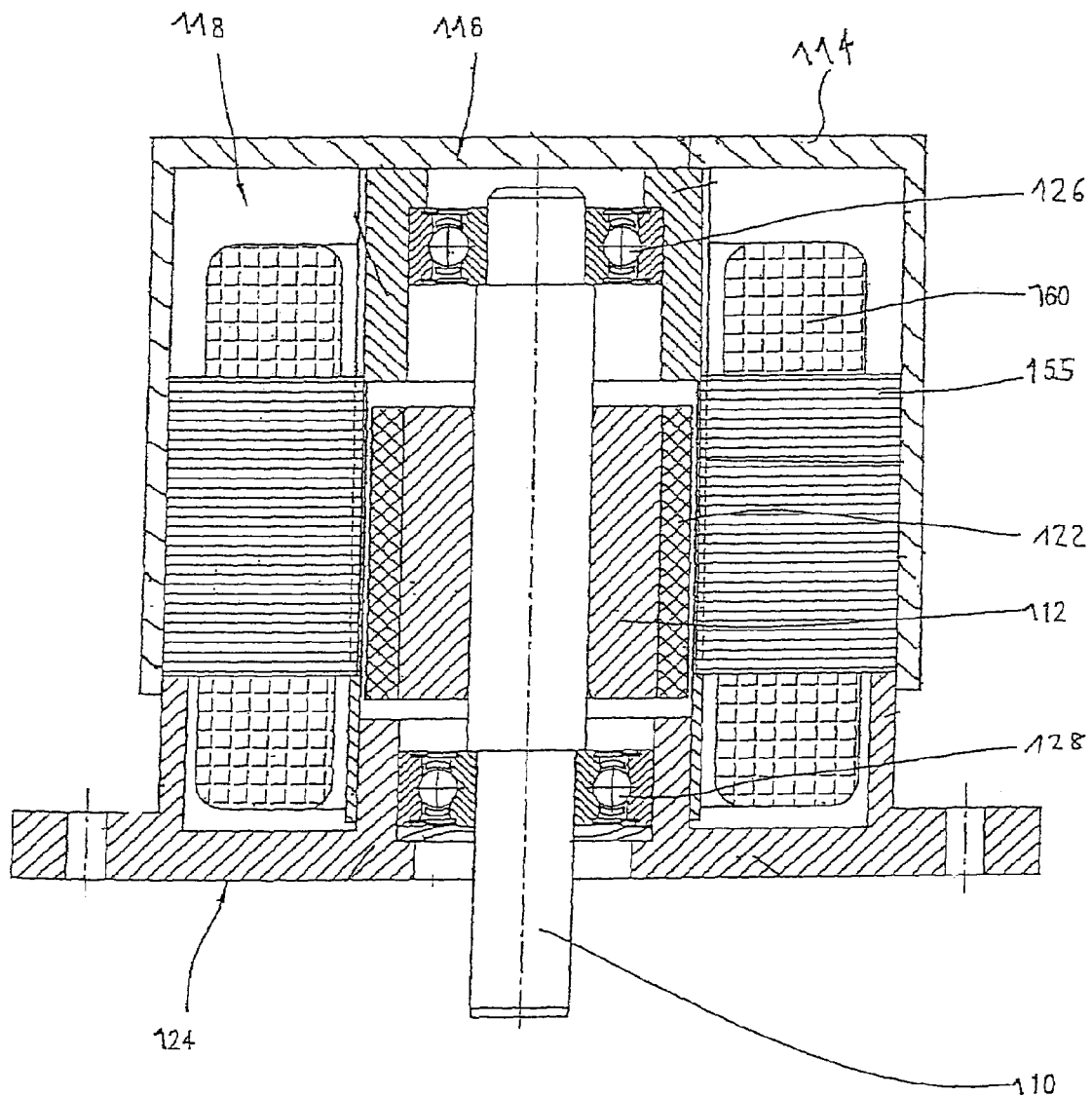

FIG. 3 shows the basic construction of an electric inner rotor motor for the purpose of explaining the background of the invention. The motor comprises a housing 114 in which a stator arrangement 118, a rotor arrangement 116 as well as bearings 126, 128 to rotatably journal the rotor arrangement are accommodated. The stator arrangement 118 comprises stacked metal laminations 155 and windings 160 and defines an inner space into which the rotor arrangement 116 can be inserted. The rotor arrangement 116 includes the shaft 110, a back iron yoke 112 and permanent magnets 122. The bearings 126, 128 supporting the rotor arrangement can be integrated into a flange 124 in the motor housing 114. As mentioned above, FIG. 3 serves to explain the basic construction of an electric motor where the stator according to the invention can be configured as either an inner rotor motor or an outer rotor motor. In the case of an outer rotor motor, the stator is mounted onto the shaft and is enclosed by the rotor.

Figure 1:
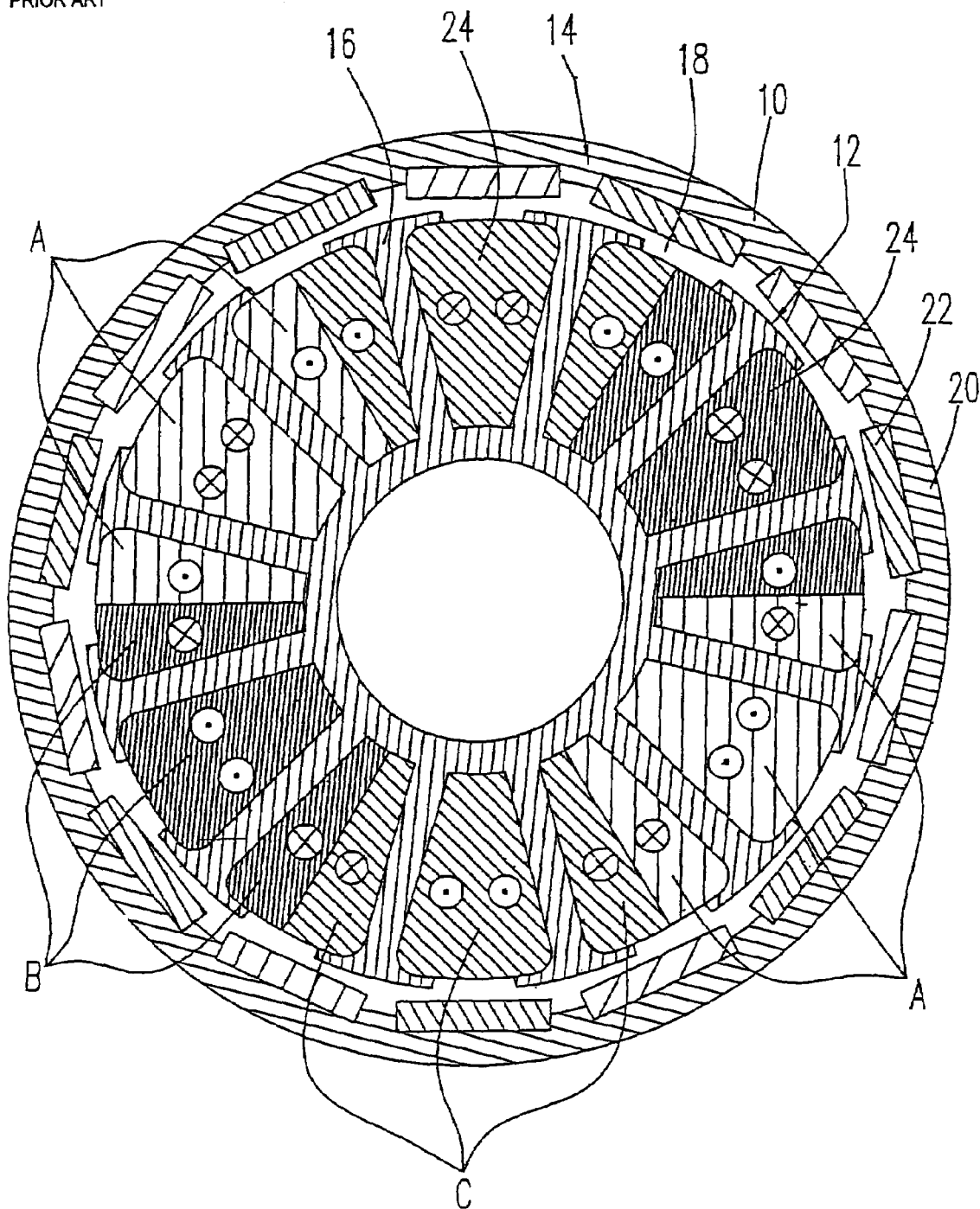

FIG. 1 shows a schematic sectional view through an outer rotor motor according to the prior art.

The electric motor schematically illustrated in FIG. 1 comprises a housing 10 in which a stator arrangement 12 and a rotor arrangement 14 are accommodated. The stator arrangement 12 is built up, for example, from a stack of stamped metal laminations having stator teeth 16 and stator slots 18 formed between the stator teeth 16. The stator slots 18 are open towards the outer circumference of the stator arrangement 12 and the stator arrangement 12 is entirely enclosed by the rotor arrangement 14. The rotor arrangement 14 comprises a rotor body 20 in which permanent magnets 22 are embedded. The direction of magnetization of the permanent magnets is shown by arrows in FIG. 1 (north→south).

In the excited permanent magnetic electric motor illustrated in FIG. 1, the coils or stator windings 24 are wound about stator teeth 16 which form "electromagnetic poles" according to the direction of current. The illustrated electric motor is also referred to as a slotted motor.

In many cases slotted motors are designed so that the stator windings are wound about one stator tooth 16 alone. This is called one-tooth or concentrated winding. FIG. 1 shows a typical design for a stator having 12 slots, where it is easy to see from FIG. 1 that one half of two stator windings or coils 24 are accommodated in each stator slot 18. In FIG. 1, the stator windings 24 having different phases are designated by different hatchings, the coils 24 of a first phase being indicated by A, of a second phase by B and a third phase by C.

For specific combinations of the number of pole pairs of the rotor arrangement 14 and the number of slots of the stator arrangement 12, the halves of two coils 24 lying within one stator slot may even belong to the same phase. This also applies to the combination illustrated in FIG. 1 having 12 stator slots and 14 poles. The winding pattern for the electric motor illustrated in FIG. 1 can be laid out as follows:

| Slot no. | 1 | 2 | 3 | 4 | 5 | 6 | 7 | 8 | 9 | 10 | 11 | 12 |
|---|---|---|---|---|---|---|---|---|---|---|---|---|
| Stator winding | A | a | b | B | C | c | a | A | B | b | c | C |

In this table, the winding direction is designated by capital and small letters and thus indicates whether the winding belonging to the respective phase directs the current into the slot or leads it away from the slot. It can also be said that this goes to indicate whether the winding and thus the direction of current is arranged clockwise or anticlockwise about the stator tooth concerned.

The stator windings 24 of the stator arrangement illustrated in FIG. 1 are wound using Flyer technology. Here, the wires of the stator windings are led through the slot openings between two stator teeth 16 and held under tension in such a way that they are engaged on the respective stator tooth 16. Accordingly, this means that the space available for the stator winding cannot be fully exploited.

Based on the prior art as described above, it is the object of the invention to provide a stator for an electric motor which makes it possible for an improved space factor to be achieved and makes the insertion of the stator windings into the stator slots easier.

SUMMARY OF THE INVENTION

Thus according to the invention, a stator is provided in which the stator windings do not only lie next to each other in the direction of the circumference as is commonly the case, but in which the radial dimension of the stator is additionally exploited and the windings of several phases are arranged one on top of the other in selected deeper stator slots. The design of the stator according to the invention goes to increase the copper space of the stator slots, resulting in an improved space factor and improved exploitation of the electric motor. In a three-phase electric motor having a nine-slot stator it is possible, for example, to increase the number of winding portions from three to four by providing a deeper stator slot per phase. If for each phase of the electric motor, a deeper stator slot is provided, it generally applies that for an electric motor having x phases and a stator body having y slots, for each phase of the electric motor $$\left(\frac{y}{x}\right)+1$$

windings can be provided.

In a preferred embodiment of the invention, the stator slots are defined by side walls which are arranged essentially parallel to each other. As a result, each stator slot defines a space which is preferably approximately cube-shaped. This space is open to the inner circumference or to the outer circumference of the stator core in order to form a stator for an inner rotor motor or an outer rotor motor respectively, the closed bottom of each slot being either flat or curved.

The design of the stator slots according to the invention makes it possible to use prefabricated coils as stator windings which are simply slid over the stator teeth from the slot opening, or to easily insert the windings into the stator slots since, at their open ends, the openings of these stator slots are not constricted as is commonly the case in the prior art.

Stator slots which receive the stator windings of several phases are made deeper than the stator slots which receive the stator windings of only one phase. The stator windings which belong to different phases lie one behind the other in a radial direction and not next to each other as in the prior art. Prefabricated coils are preferably slid onto the stator teeth. In practice, the coils can be wound and formed externally and then inserted into the approximately cube-shaped slots.

According to the invention, provision can further be made for the stator core to have other recesses separate from the stator slots. These recesses are used, on the one hand, to reduce the weight of the stator core, but can also be used as channels to ventilate the stator core for improved thermal conductivity.

SHORT DESCRIPTION OF THE DRAWINGS

Figure 2:
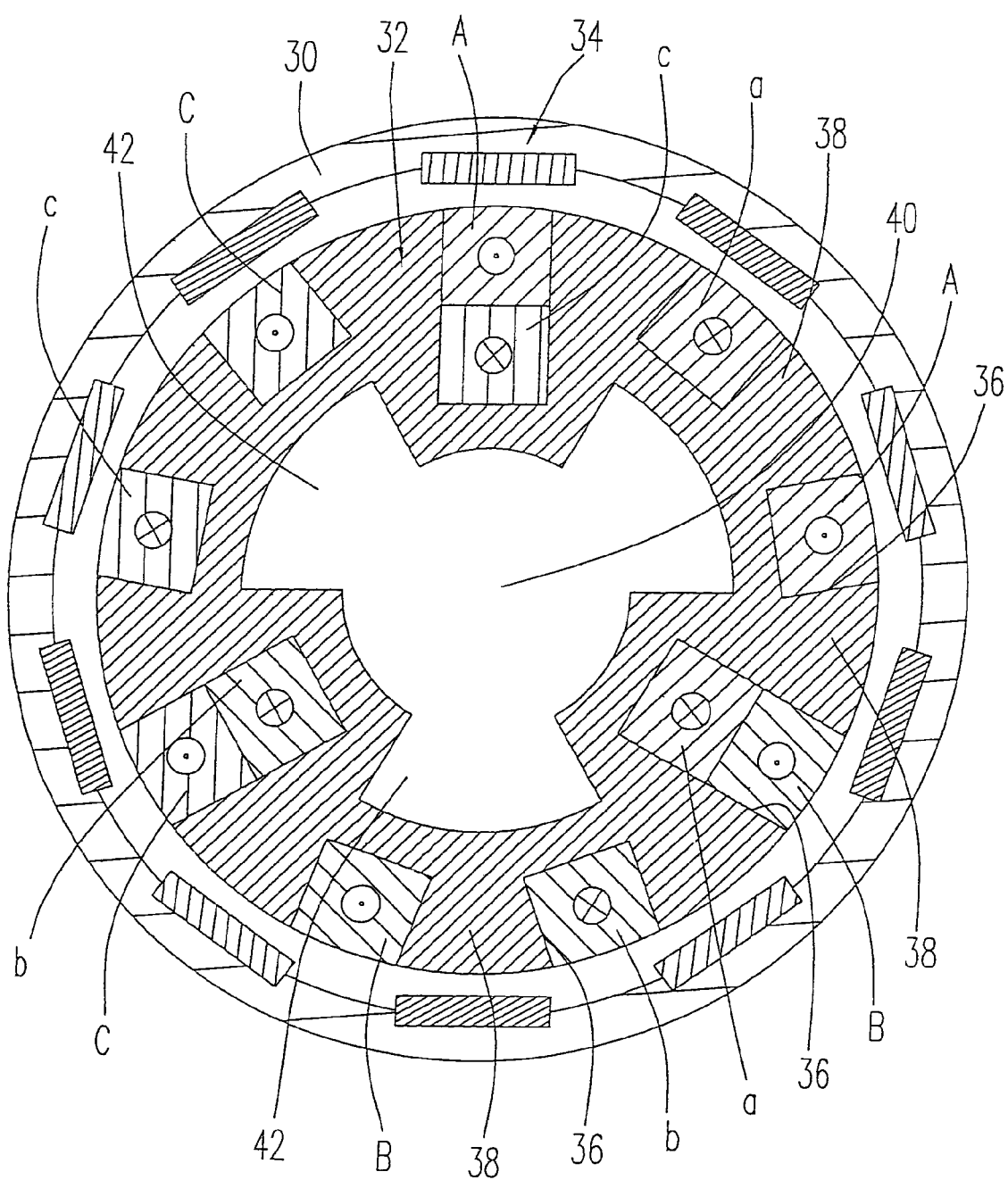

The invention is described below on the basis of a preferred embodiment with reference to the figures. The figures show:

FIG. 1 a schematic sectional view through an electric motor according to the prior art;

FIG. 2 a schematic sectional view through an electric motor according to the invention; and FIG. 3 a schematic longitudinal view through an electric motor according to the prior art.

Figure 4:
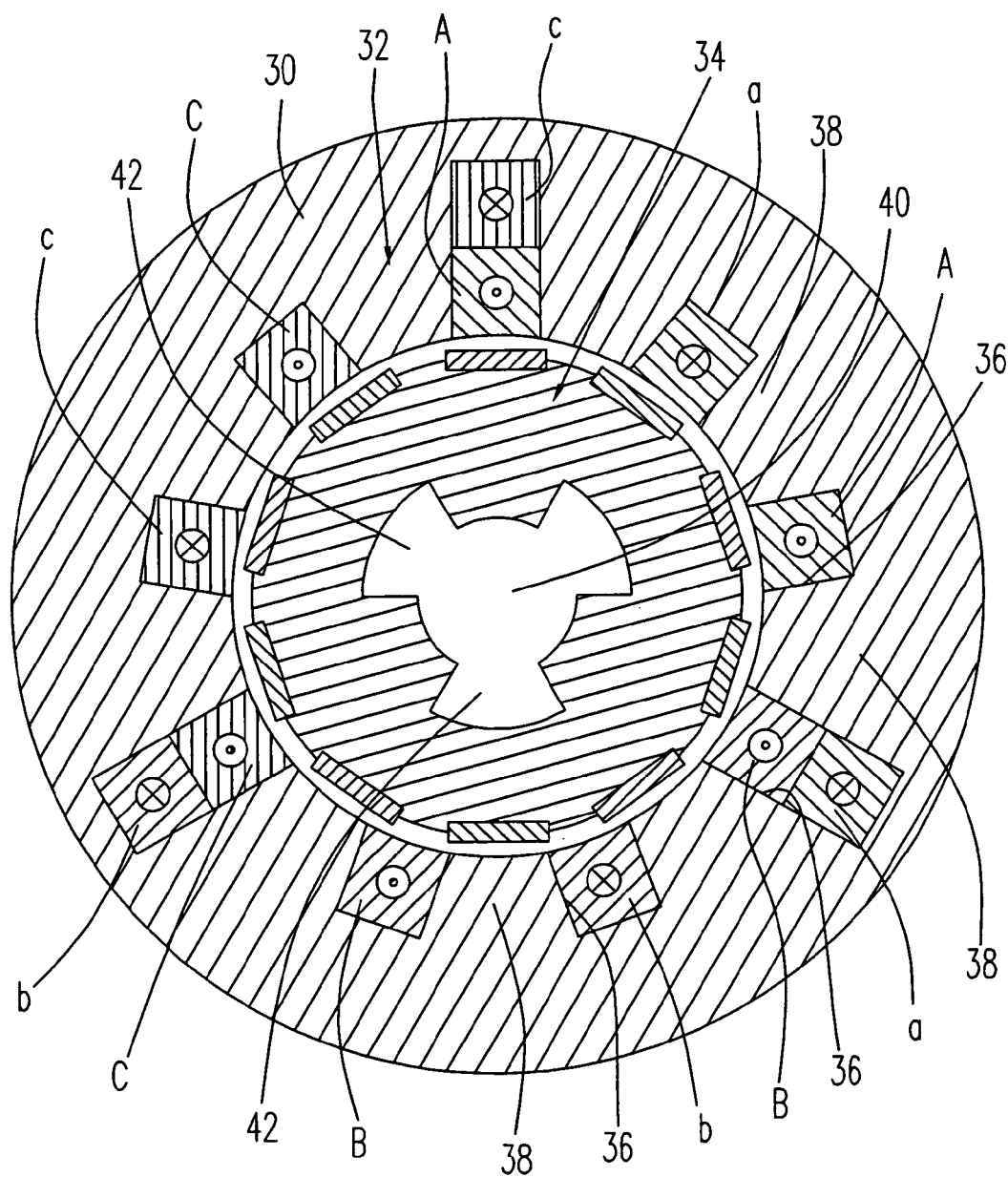

FIG. 4 shows a schematic sectional view through an electric motor having a stator body according to the invention.

DETAILED DESCRIPTION OF PREFERRED EMBODIMENTS

The electric motor illustrated in FIG. 2 comprises a housing 30 in which a stator arrangement 32 and a rotor arrangement 34 are accommodated. The basic component of the stator arrangement is a stator body having a stator core or stator back yoke which can be made up, for example, of stacked iron laminations or pressed from iron powder. The rotor arrangement 34 can essentially be constructed as described in reference to FIG. 1 and is not gone into in more detail again here.

The stator arrangement has stator slots 36 and stator teeth 38. As shown in FIG. 2, the stator slots can extend in a radial direction into the stator core to different depths. The side walls of each stator slot 36 are arranged essentially parallel to each other. The stator slots 36 with parallel side walls go to produce stator teeth 38 which widen towards the outer circumference of the stator arrangement 32 which has a beneficial effect on the flow transfer behavior between the stator arrangement 32 and the rotor arrangement 34.

The stator arrangement 32 is mounted onto a shaft 40. As shown in FIG. 2, the stator body has recesses 42 used, on the one hand, to reduce weight but can, however, also be designed as channels for ventilation or to conduct a cooling liquid for improved thermal conductivity.

FIG. 2 shows a stator arrangement 32 for a 9-slot outer rotor motor in combination with a 10-pole permanent magnet. Numbering the slots from 1 to 9 produces the winding pattern:

| Slot no. | 1 | 2 | 3 | 4 | 5 | 6 | 7 | 8 | 9 | |
|---|---|---|---|---|---|---|---|---|---|---|
| Stator winding | A | a | A | B | b | B | C | c | C | outer position |
| | c | | | a | | | b | | | inner position (moved radially inwards) | where again capital or small letters indicate whether the current flows in a positive or negative direction through the stator windings, while the letter itself designates the associated phase. The stator windings of the different phases are also indicated in FIG. 2 by different hatchings.

As shown in FIG. 2, those stator slots 36 in which the stator windings of two phases are accommodated are made deeper. Here, the stator windings lie one behind the other in a radial direction and not next to each other as in the prior art. Stator slots 36 which only carry the stator windings of one phase are designed to be correspondingly less deep. This arrangement results in an improved space factor of the stator according to the invention, offering more copper space than conventional stators and thus leading to improved exploitation of the electric motor.

Through the invention, a stator arrangement is created which makes it possible for the wound stator coils to be easily inserted into the stator slots or even for prefabricated coils to be simply slid over the corresponding stator teeth. The special design of the stator slots and the stator teeth goes nonetheless to create a good flow transfer behavior to the corresponding rotor arrangement. According to the invention, the stator slots preferably take the approximate shape of cubes having parallel side walls. The stator teeth, however, need not have parallel side walls. If they are designed to taper towards the inside, then the depth of the slots should be suitably adjusted to achieve the same winding surface for the inner as for the outer positions of the phase windings.

The characteristics revealed in the above description, the claims and the figures can be important for the realization of the invention in its various embodiments both individually and in any combination whatsoever.

IDENTIFICATION REFERENCE LIST

10 Housing
12 Stator arrangement
14 Rotor arrangement
16 Stator teeth
18 Stator slot
20 Rotor body
22 Permanent magnets
24 Stator windings, coils
30 Housing
32 Stator arrangement
34 Rotor arrangement
36 Stator slots
38 Stator teeth
40 Shaft
42 Recesses
110 Shaft
112 Back iron yoke
114 Housing
115 Metal laminations
116 Bearing
118 Stator arrangement
122 Permanent magnet
124 Flange
128 Bearing
160 Windings

The invention claimed is:

1. A stator assembly for an electric motor the stator assembly comprising a stator core having a plurality of stator teeth and stator slots located between the stator teeth for receiving stator windings, wherein the depth of each of the stator slots is proportional to the number of phases of said stator windings to be contained therein, wherein for each phase of the electric motor at least one stator slot has a greater depth than the other stator slots in order to accommodate axis-parallel portions of the stator windings of two phases of the electric motor, and wherein other stator slots having a smaller depth than the at least one stator slot are adapted to accommodate axis-parallel portions of the stator windings of only one phase of the electric motor.

2. A stator according to claim 1, wherein the axis-parallel portions of the stator windings of adjacent phases are each arranged one on top of the other in a radial direction in a deeper stator slot.

3. A stator according to claim 1, wherein for each phase of the electric motor, one stator slot has a greater depth, the electric motor having x phases and the stator body having y slots so that for each phase of the electric motor $$\left(\frac{y}{x}+1\right)$$

winding portions are provided.

4. A stator according to claim 2, wherein for each phase of the electric motor, one stator slot has a greater depth, the electric motor having x phases and the stator body having y slots so that for each phase of the electric motor $$\left(\frac{y}{x}+1\right)$$

winding portions are provided.

5. A stator according to claim 1, wherein each stator slot is defined by side walls which are arranged essentially parallel to each other.

6. A stator according to claim 5, wherein each stator slot is essentially cube-shaped.

7. A stator according to claim 1, wherein the stator core has recesses separate from the stator slots.

8. A stator according to claim 7, wherein the recesses form ventilation channels which extend through the stator core.

9. The stator assembly of claim 1 further comprising prefabricated stator windings.

10. A stator according to claim 9, wherein the stator slots define a space which is open towards the inner circumference of the stator core in order to form a stator for an inner rotor motor.

11. A stator according to claim 9, wherein the stator slots define a space which is open towards the outer circumference of the stator core in order to form a stator for an outer rotor motor.

12. A stator assembly for an electric motor, the stator assembly comprising a stator core having a plurality of stator teeth and stator slots located between the stator teeth for receiving stator windings, wherein the depth of at least one of the stator slots is different than an adjacent stator slot and wherein at least one pair of adjacent stator slots possess substantially parallel side walls, and wherein the depth of each of the stator slots is proportional to the number of phases of said stator windings to be contained therein.

13. A stator according to claim 12, wherein axis-parallel portions of the stator windings of adjacent phases are each arranged one on top of the other in a radial direction in a deeper stator slot.

14. A stator according to claim 12, wherein for each phase of the electric motor, one stator slot has a greater depth, the electric motor having x phases and the stator body having y slots so that for each phase of the electric motor (y/x+1) winding portions are provided.

15. A stator according to claim 12, wherein each stator slot is essentially cube-shaped.

16. A stator according to claim 12, wherein the stator core has recesses separate from the stator slots.

17. A stator according to claim 16, wherein the recesses form ventilation channels which extend through the stator core.

18. A method of manufacturing a stator rotor comprising the steps of:
   providing a stator core;
   forming a first plurality of stator slots having a first depth for receiving stator windings of one phase; and
   forming a second plurality of stator slots having a second depth for receiving stator windings of more than one phase wherein the depth of each of the stator slots is proportional to the number of phases of said stator windings to be contained therein.

19. The method of claim 18 wherein the depth of the second plurality of stator slots is greater than the depth of the first plurality of stator slots.

* * * * *

UNITED STATES PATENT AND TRADEMARK OFFICE
CERTIFICATE OF CORRECTION

PATENT NO. : 7,183,688 B2
APPLICATION NO. : 11/067276
DATED : February 27, 2007
INVENTOR(S) : Helmut Hans It is certified that error appears in the above-identified patent and that said Letters Patent is hereby corrected as shown below:

On the title page (73)
Name of Assignee should read -- Minebea Co., Ltd. --

Signed and Sealed this

Twelfth Day of June, 2007

JON W. DUDAS
*Director of the United States Patent and Trademark Office*